United States Patent [19]

Sieckman

[11] 4,365,992
[45] Dec. 28, 1982

[54] METHOD OF TREATING FERROUS METAL

[75] Inventor: Walter Sieckman, Pittsburgh, Pa.

[73] Assignee: Pennsylvania Engineering Corporation, Milwaukee, Wis.

[21] Appl. No.: 294,446

[22] Filed: Aug. 20, 1981

[51] Int. Cl.³ .............................................. C21C 5/48
[52] U.S. Cl. ......................................... 75/60; 75/52; 75/59
[58] Field of Search .............................. 75/59, 60, 52

[56] References Cited

U.S. PATENT DOCUMENTS 4,089,677  5/1978  Spenceley ............................. 75/60
4,304,598 12/1981  von Bogdandy ...................... 75/60

Primary Examiner—P. D. Rosenberg
Attorney, Agent, or Firm—Fred Wiviott

[57] ABSTRACT

A method of treating ferrous metal includes the steps of containing in a metallurgical vessel a quantity of ferrous metal which is at least partially solid in form, entraining finely divided carbon and a fluxing agent in a nonoxidizing gas and injecting the same in a first flow path and from beneath said metal, simultaneously injecting a first quantity of oxygen in a second flow path separate from said first flow path and beneath said metal for oxidizing the carbon to elevate the temperature of said metal. A second quantity of oxygen is injected into the metal in a third flow path and from above the metal for reducing the carbon content thereof. Additional fluxing agents may also be introduced from above the metal. After the desired metal temperature has been achieved, the delivery of carbon and fluxing agents through the first flow path is terminated while the flow of nonoxidizing gas is continued to promote mixing. The delivery of oxygen through the second and third flow paths is continued until the level of carbon in the metal has been reduced to a predetermined level.

13 Claims, 1 Drawing Figure

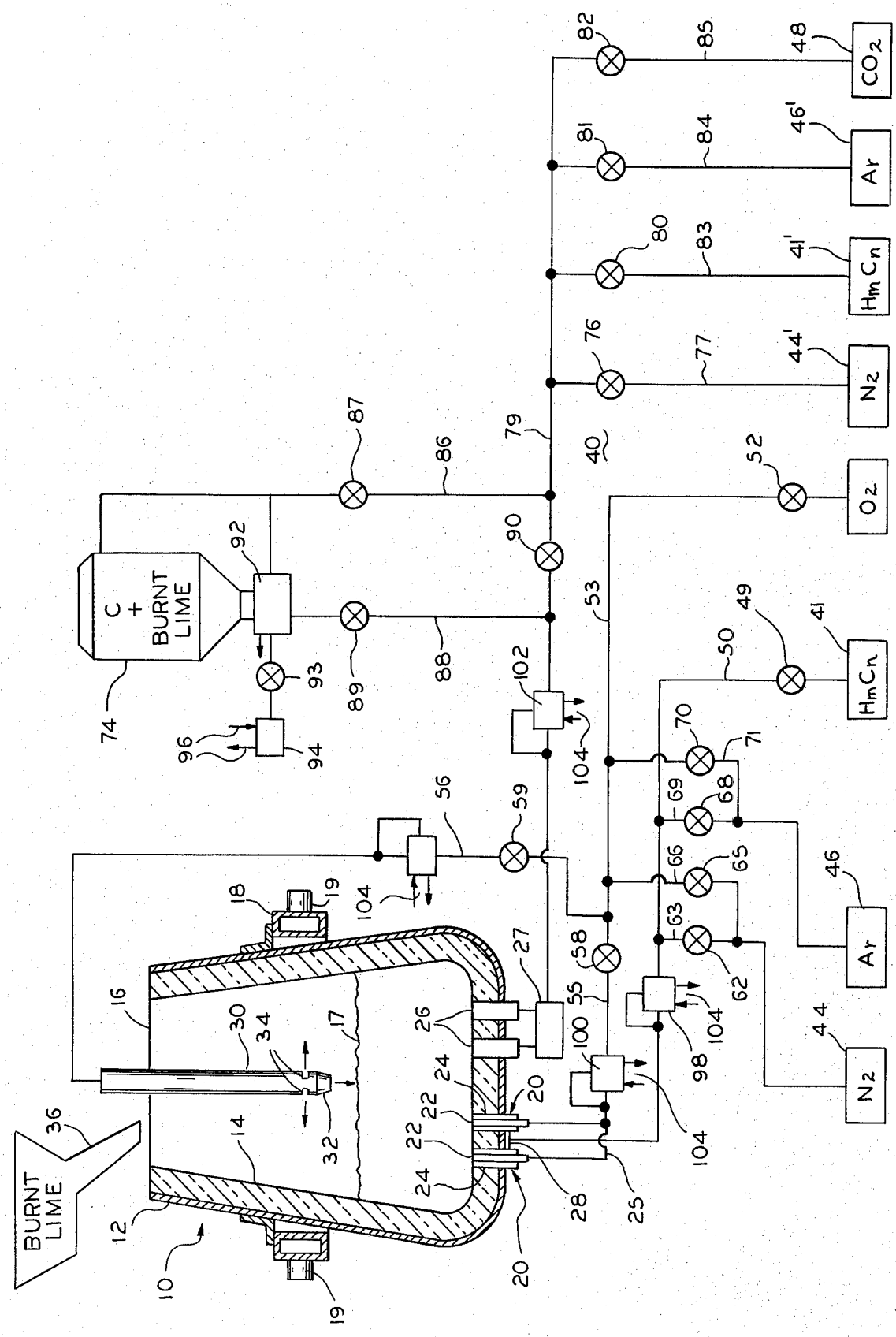

METHOD OF TREATING FERROUS METAL

BACKGROUND OF THE INVENTION

This invention relates to bottom-blown metallurgical processes.

One iron refining method known as Q-BOP involves the injection of oxygen into a molten metal bath through tuyeres located beneath the metal surface. In order to minimize or control the erosion of tuyeres and the adjacent refractory, a hydrocarbon shielding fluid, such as propane, natural gas, coal gas or light oil is commonly injected in surrounding relation to the oxygen stream. Fluxing agents such as burnt lime may also be injected into the vessel by entrainment in oxygen or in nonoxidizing gases. This process is described in U.S. Pat. No. 3,706,549.

Because the oxidation of such elements as carbon, silicon, phosphorus and manganese, in ferrous metal is exothermic, it is possible in the Q-BOP process to at least partially employ solid ferrous materials such as scrap, iron pellets, solid pig iron and the like which are generally more economical than hot metal. In order to increase the ability to utilize increased proportions of solid iron in the Q-BOP process, additional outside sources of energy have been employed. One such method is discussed in U.S. Pat. No. 4,198,230 wherein the concentric two-pipe tuyeres are employed as preheat burners.

During the normal oxygen blow in Q-BOP vessels, the amount of hydrocarbon required for tuyere and refractory protection is only a small proportion by volume of the oxygen which is introduced for the purpose of reducing carbon and other elements. For example, when propane is employed as the shielding fluid, its flow rate is only about one percent by volume of that of oxygen during the refining stage of the process. As a result, the center tuyere pipe is substantially larger in area than the gap between the center and outer tuyere pipes. This is satisfactory, of course, when the tuyeres are used for oxygen injection. However, when the tuyeres are used as preheat burners, it is not possible to obtain stoichiometric conditions when gaseous fuels are employed. Accordingly, in the process of U.S. Pat. No. 4,198,230, a denser hydrocarbon, such as oil, is employed as the preheat fuel. For this reason, it is necessary to provide switching valves which permit delivery of oil to the gap between the tuyere pipes during the preheat period and a gaseous hydrocarbon source during the main oxygen blow.

In order to further increase the hydrocarbon fuel available for preheating and scrap melting, it has also been suggested that a solid fuel, such as coke, be employed. This material may be added along with the solid metallic charge or it may be entrained in a nonoxydizing gas, such as nitrogen, and injected through at least some of the tuyeres. The use of solid fuels also requires switching prior to the main oxygen blow or refining step.

SUMMARY OF THE INVENTION

It is a primary object of the invention to provide a new and improved bottom-blown iron refining process.

It is a further object of the invention to provide a steel making process which permits the increased utilization of solid ferrous materials.

Another object of the invention is to provide a steel making process utilizing solid ferrous charge materials wherein it is not necessary to switch from liquid to gaseous fuels at the bottom tuyeres when the fluidizing of the charge materials has been completed.

These and other object and advantages of the invention will become apparent from the detailed description thereof taken with the drawing.

In general terms, the invention comprises a method of treating ferrous metal including the steps of charging a vessel with said metal in solid form, injecting into the vessel and in a first flow path from beneath said metal finely divided carbon entrained in a nonoxidizing gas during a preheating step, simultaneously injecting a quantity of oxygen into the vessel through a second flow path beneath the metal and separate from the first flow path for oxidizing the carbon to fluidize the metal during the preheating step, injecting hydrocarbon shielding fluid in surrounding relation to the oxygen, discontinuing the flow of carbon through the first flow path but continuing to inject nonoxidizing gas for stirring the molten metal during a refining step, and continuing to inject oxygen and hydrocarbon shielding fluid through the second flow path during the refining step for oxidizing carbon in the molten metal.

BRIEF DESCRIPTION OF THE DRAWING

The single FIGURE of the drawing schematically illustrates apparatus in which the process of the invention may be carried out.

DETAILED DESCRIPTION OF THE PREFERRED EMBODIMENT

The single FIGURE of the drawing schematically illustrates an apparatus in which the present invention may be carried out. In general terms, the apparatus includes a vessel 10 having a generally pear-shaped configuration and including an outer metallic shell 12 and a refractory lining 14. An opening 16 is formed in the upper end of the vessel for receiving a ferrous furnace charge 17. The vessel 10 may be supported on a trunnion ring 18 which has a pair of trunnion pins 19 extending from its opposite sides to permit the vessel to be tilted for charging and the discharge of hot metal.

A first plurality of tuyeres 20 extend through the lower end of vessel 10 and each includes an inner tuyere pipe 22 and an outer tuyere 24 spaced from the inner tuyere pipe 22 so that a gap exists therebetween. Each inner tuyere pipe 22 thus defines a first flow passage and the gap between pipes 22 and 24 define a second tuyere passage disposed in concentric surrounding relation to the first passage. A first manifold 26 connects all of the inner tuyere pipes 22 in a parallel relation and a second manifold 28 similarly connects the outer tuyere pipes 24. While only a pair of tuyeres 20 are illustrated, those skilled in the art will appreciate that the number and arrangement of tuyeres may vary with the size of the vessel and the chemical composition of the metal being treated.

A second plurality of tuyeres 26 also extend through the lower end of the vessel 10 and beneath the surface of the metal 16. While the tuyeres 26 are shown to comprise a single pipe which is connected to a particle distributor 27, two pipe tuyeres similar to tuyeres 20 may also be employed, in which event both pipes are connected to distributor 27.

Extending downwardly through the opening 16 in vessel 10 is a lance 30. While the details of the lance 30 are not shown in detail, those skilled in the art will appreciate that it will include a first nozzle 32 for projecting oxygen downwardly into the ferrous metal 17 and secondary openings 34 for delivering oxygen into the area above the metal 17 for purposes which will be discussed more fully below. In addition, means (not shown) are provided moving the lance 30 vertically relative to the vessel 10. Also, for purposes which will be discussed more fully below, a feed hopper 36 is positioned for delivering a fluxing agent such as burnt lime through the open upper end of the vessel 16. Those skilled in the art will appreciate that a gas collecting and cleaning system (not shown) will also be provided for collecting off-gases from vessel 16 to prevent air pollution.

The tuyeres 20 and 26 are connected to a plurality of fluid sources by a flow control system 40. The fluid sources may, for example, comprise a hydrocarbon fuel 41 and 41'; oxygen 42, nitrogen 44 and 44'; argon 46 and 46'; and carbon dioxide 48.

The hydrocarbon fuel 41, which may comprise any suitably available fuel such as natural gas, propane, coal gas or light oil, is connected to the manifold 26 by valve 49 and pipe 50. A valve 52 and a pipe 53 connect the oxygen source 42 to pipes 55 and 56 which are respectively connected to the oxygen manifold 25 and to oxygen lance 30. The valves 58 and 59 in pipes 55 and 56, respectively, permit selective oxygen control.

The nitrogen and argon sources 44 and 46 are each selectively connectable to both the manifolds 25 and 26 for feeding the tuyere pipes 22 and 24. More particularly, the nitrogen source 44 is connected by valve 62 and pipe 63 to pipe 50 which in turn is connected to the manifold 26 and by valve 65 and pipe 66 to pipe 53 which in turn is connected to manifold 25. Similarly, the argon source 46 is connected by valve 68 and pipe 69 to pipe 53 and by valve 70 and pipe 71 to pipe 53.

The nitrogen, argon, hydrocarbon gas and carbon dioxide sources 42', 44', 46' and 72 are each connected to the tuyeres 26 either directly or through a pressure vessel 74 to permit the entrainment of powdered carbon and burnt lime. In particular, nitrogen source 44' is connected by valve 76 and pipe 77 to conduit 79, the other end of which is connected to the particle distributor 27. The argon, hydrocarbon gas, nitrogen and carbon dioxide sources 41', 46' and 72 are similarly connected to pipe 79 through valves 80, 81 and 82 and pipes 83, 84 and 85, respectively. A first pipe 86 and valve 87 couple the pressure chamber 74 to conduit 79 and a second pipe 88 and valve 89 provide a return path from vessel 74 to pipe 79. A valve 90 disposed in pipe 79 and between pipes 86 and 88 permit either nitrogen, hydrocarbon gas, argon or carbon dioxide to be shunted through the pressure vessel 74.

The mixture of powdered carbon and a fluxing agent such as burnt lime is stored within vessel 74 for entrainment in either nitrogen, hydrocarbon or carbon dioxide, argon for delivery to the tuyeres 26 for purposes which will be described more fully below. It will be appreciated that the four gases are illustrated as possible available alternatives, although in actual practice only one is required. In the preferred embodiment, nitrogen is employed and this gas will be referred to exclusively in the description below, it being understood that any suitable non-oxidizing gas may be employed.

In order to entrain the material in the nitrogen gas in a preselected proportion, vessel 74 is provided with a mixing device 92 at its lower end. While the details of mixing device 92 are not shown, they may be of any type well known in the art such as, for example, the type which withdraws powdered material from vessel 74 and injects it into the gas stream. The mixing device 92 may be operated by any suitable motor 93 operated under the influence of a controller 94. Suitable control signals supplied to controller 94 are symbolized by arrows 96. The flow of gases to the tuyere pipes 20 and 26 may be controlled by flow controllers 98, 100 and 102 which are respectively interposed in pipes 50, 55 and 79 and each of which is controlled by signals symbolized by arrows 104.

In the process according to the invention, the vessel 10 is first charged with ferrous metal in solid form which may comprise, for example, scrap, prereduced iron pellets, pig iron, sponge iron or mixtures thereof. In addition, a mixture of powdered carbon and burnt lime is entrained in nitrogen (or other non-oxidizing gas) and injected into the vessel through tuyeres 26 while oxygen for combustion is injected through the center pipes 22 of tuyeres 20. In addition, a hydrocarbon shielding fluid such as propane, natural gas, coal gas, or light oil is injected through the gap between tuyere pipes 22 and 24. The rate of oxygen and fuel delivery to the system is adjusted by controllers 98, 100 and 102 to approximate stoichiometric conditions and to provide the required heat input. Preheating of the ferrous metal charge will continue until the same is fluidized, which occurs in the case of carbon steel scrap at a temperature of approximately 2700°–2750° F.

After fluidization of the metallic charge, a pool of metal 17 will form in the vessel 10. The lance 30 is then lowered to deliver the major portion of the oxygen required for oxidizing carbon silicon phosphorous and manganese within the pool 17. The delivery of oxygen and hydrocarbon shielding fluid also continues through tuyeres 20 to provide a minor portion of the oxygen required for this purpose. Because these reactions are exothermic, additional heat will be added to the melt. The delivery of carbon to the metal through tuyeres 26 may continue, however, for temperature adjustment. After the desired high bath temperature has been achieved, valves 85 and 89 are closed and valve 90 is opened so that the delivery of burnt lime and carbon through the tuyeres 26 is terminated but the delivery of nitrogen or other nonoxidizing gas continues. However, the bulk of the burnt lime is delivered from the charging chute 36 in particulate form. The injection of nitrogen gas to the melt 17 promotes mixing of the bath to obtain chemical equilibrium conditions in the liquid and between the liquid steel and the slag as the refining step continues. The blowing of oxygen from above and below the melt 17 continues until the carbon level thereof is reduced to a preselected value.

In addition to the delivery of oxygen from lance 30 for oxidizing constituents of the bath 17, the side openings 34 permit the injection of a minor proportion of the oxygen above the bath for combusting off-gases such as hydrogen and carbon monoxide. This provides additional heat to the charge 17.

The vessel 10 may also be charged with both solid materials and liquid hot metal. For example, the vessel may first be charged with solid materials and preheated as described above. However, preheating is terminated at a temperature below that which will result in fluidization, i.e., about 2000° F. The blowing of oxygen and hydrocarbon through tuyeres 20 and carbon entrained in nitrogen through tuyeres 26 is terminated and a non-oxidizing gas, such as nitrogen, is substituted while the vessel is turned down to receive a hot metal charge. The vessel is then turned up and the blowing of oxygen and shielding gas through tuyeres 20 and carbon entrained in nitrogen through tuyeres 26 is resumed. This continues until the metal is fluidized, at which time refining proceeds as discussed above.

By delivering powdered fuel in an inert gas through tuyeres 26 which are separate from the tuyeres 20 that are employed during the refining step, sufficient fuel is delivered to the vessel to approximate stoichiometric conditions without the necessity for switching valves adjacent the tuyeres. As a result, the potential for dangerous conditions are not created by the possibility of valve failure.

While only a few embodiments of the invention have been illustrated and described, it is not intended to be limited thereby but only by the scope of the appended claims.

I claim:

1. A method of treating ferrous metal including the steps of charging a vessel with ferrous metal in a solid form,
injecting into said vessel and in a first flow path from beneath said metal finely divided carbon entrained in a nonoxidizing gas during a first preheating step,
simultaneously injecting a quantity of oxygen into said vessel through a second flow path beneath said metal and separate from said first flow path for oxidizing the carbon to fluidize the metal within said vessel during said preheating step,
injecting a hydrocarbon shielding fluid in surrounding relation to said oxygen,
discontinuing the flow of carbon through said first flow path after said metal is at least partially fluidized but continuing to inject the nonoxidizing gas for stirring said molten metal during a refining step,
continuing to inject oxygen and the surrounding hydrocarbon shielding fluid through said second flow path and into said fluidized metal during said refining step for oxidizing carbon in said molten metal.

2. The method set forth in claim 1 wherein the oxygen delivered through said second flow path during said refining step is a minor portion of that required for oxidation of carbon within said metal, and injecting the major portion of oxygen required for carbon oxidation during said refining step from above said molten metal and in a third flow path.

3. The method set forth in claims 1 or 2 wherein said nonoxidizing gas is taken from the group consisting of nitrogen, argon, carbon dioxide, propane and natural gas.

4. The method set forth in claim 3 wherein a minor portion of a fluxing agent is injected in finely divided form with said nonoxidizing gas and a major portion thereof is delivered in bulk form from above said metal.

5. The method set forth in claim 4 wherein said fluxing agent is burnt lime.

6. The method set forth in claims 1 or 2 wherein said nonoxidizing gas is nitrogen.

7. The method set forth in claim 6 wherein a minor portion of a fluxing agent is injected in finely divided form with said nitrogen and a major portion delivered in bulk form from above said metal.

8. A method of treating ferrous metal including the steps of charging a vessel with ferrous metal in solid form, injecting into said vessel and in a first flow path from beneath said vessel finely divided carbon entrained in a nonoxidizing gas during a first preheating step,
simultaneously injecting a quantity of oxygen into said vessel through a second flow path beneath said metal and separate from said first flow path for oxidizing the carbon to preheat said metal,
injecting hydrocarbon shielding fluid in surrounding relation to said oxygen,
discontinuing the injection of said carbon and then charging said vessel with liquid hot metal, injecting oxygen and a hydrocarbon shielding fluid in surrounding relation to said oxygen through said second flow path for oxidizing carbon in said liquid hot metal thereby adding additional heat to said metal for fluidizing said solid ferrous metal during a melting step,
injecting a nonoxidizing gas through said second flow path during said melting step for stirring said molten metal, and
continuing to inject oxygen through said second flow path during a refining step for reducing the carbon level in said metal to a predetermined value.

9. The method set forth in claim 1 wherein the oxygen delivered through said second flow path during said refining step is a minor portion of that required for oxidation of carbon within said metal, and injecting the major portion of oxygen required for carbon oxidation during said refining step from above said molten metal.

10. The method set forth in claims 8 or 9 wherein said nonoxidizing gas is taken from a group consisting of nitrogen, argon, carbon dioxide, propane and natural gas.

11. The method set forth in claim 10 wherein a minor portion of a fluxing agent is injecting in finely divided form with said nonoxidizing gas and a portion thereof is delivered in bulk form from above said metal.

12. The invention set forth in claim 11 wherein said nonoxidizing gas is nitrogen.

13. The method set forth in claim 12 and including the step of injecting oxygen above said metal and into gases emanating therefrom for oxidizing carbon monoxide.

* * * * *